United States Patent
Huang et al.

(10) Patent No.: US 11,224,042 B2
(45) Date of Patent: Jan. 11, 2022

(54) FREQUENCY SELECTION METHOD, RANDOM ACCESS METHOD AND APPARATUSES

(71) Applicant: CLOUDMINDS (SHENZHEN) ROBOTICS SYSTEMS CO., LTD., Shenzhen (CN)

(72) Inventors: William Xiao-Qing Huang, Shenzhen (CN); Haitao Jiang, Shenzhen (CN); Zhenkai Wang, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 35 days.

(21) Appl. No.: 16/584,945

(22) Filed: Sep. 27, 2019

(65) Prior Publication Data

US 2020/0022145 A1 Jan. 16, 2020

Related U.S. Application Data

(63) Continuation of application No. PCT/CN2017/079389, filed on Apr. 1, 2017.

(51) Int. Cl.
*H04W 72/04* (2009.01)
*H04W 74/08* (2009.01)
*H04W 74/00* (2009.01)

(52) U.S. Cl.
CPC ..... *H04W 72/0453* (2013.01); *H04W 72/042* (2013.01); *H04W 74/0833* (2013.01); *H04W 74/004* (2013.01); *H04W 74/006* (2013.01)

(58) Field of Classification Search
CPC .......... H04W 72/042; H04W 72/0453; H04W 72/0413; H04W 74/0833; H04W 74/006
See application file for complete search history.

(56) References Cited

U.S. PATENT DOCUMENTS

2006/0274685 A1 12/2006 Johnson et al.
2013/0077551 A1* 3/2013 Lo .................. H04W 16/14
370/312

(Continued)

FOREIGN PATENT DOCUMENTS

CN 1937824 A 3/2007
CN 1956356 A 5/2007

(Continued)

OTHER PUBLICATIONS

Extended European Search Report for the corresponding EP application No. 17902695.0, dated Feb. 21, 2020, 9 pages total.

(Continued)

*Primary Examiner* — Nam T Huynh
(74) *Attorney, Agent, or Firm* — USCH Law, PC

(57) ABSTRACT

The present disclosure provides a frequency selection method, a random access method, and an apparatus. The method comprises: determining a first band set, the first band set comprising at least one first working band supported by a network side device, and the first working band comprising at least one uplink frequency range and at least one downlink frequency range; and broadcasting the first band set, so that the terminal determines, according to the first band set, the at least one uplink frequency range and the at least one downlink frequency range comprised in the first working band supported by the network side device.

17 Claims, 6 Drawing Sheets

(56) References Cited

U.S. PATENT DOCUMENTS

2015/0098425 A1* 4/2015 Bergljung ............... H04L 5/001
370/329
2017/0279567 A1* 9/2017 Rahman .................. H04L 12/28

FOREIGN PATENT DOCUMENTS

| CN | 101772182 B | 11/2012 |
|----|---|---|
| EP | 2536235 A1 | 12/2012 |
| EP | 2587874 A1 | 5/2013 |
| WO | 2010146880 A1 | 12/2010 |
| WO | WO 2017048438 A1 | 3/2017 |

OTHER PUBLICATIONS

Cloudminds, Japanese Office Action, JP Application No. 2019-553393, dated Dec. 2, 2020, 5 pgs.
Cloudminds (Shenzhen) Robotics Systems Co., Ltd., JP Second Office Action, JP2019-553393, dated Sep. 8, 2021, 8 pgs.

\* cited by examiner

FREQUENCY SELECTION METHOD, RANDOM ACCESS METHOD AND APPARATUSES

CROSS-REFERENCE TO RELATED APPLICATIONS

The present application is a continuation of international application No. PCT/CN2017/079389, filed on Apr. 1, 2017, which is incorporated herein by reference in its entirety.

TECHNICAL FIELD

The present disclosure relates to the field of communications, and in particular, to a frequency selection method, a random access method, and apparatuses.

BACKGROUND

In 3G and 4G networks, the coverage capability of the uplink coverage of the system is poorer than that of the downlink coverage, which affects the transmission of uplink data. And in 5G network, the difference between the coverage capabilities of the uplink coverage and the downlink coverage is more obvious. Therefore, it is necessary to consider using a high band in cooperation with a low band. That is, when the uplink coverage of the high band itself is limited, the uplink frequency of the low band is used for uplink data transmission, wherein the high band may include frequencies such as 28 GHz and 3.5 GHz for providing capacity, and the low band may include frequencies such as 900 MHz for providing coverage.

Now, the cooperation of the high and low bands generally includes two implementations: one of which adopts a carrier aggregation implementation; and the other relates to a dual connection implementation, that is, the terminal establishes communication connections with the master service network side device and the slave service network side device respectively. However, regardless of the implementation employed, a master service network side device and a slave service network side device have to be configured for the terminal, and the time for the configuration has to be 20 ms-50 ms and configuration delay thereof is long, resulting in a longer data transmission delay. However, for sudden packet services relating to OTT business, car networking, Internet of Things and the like, requirement on data transmission delay is high. Therefore, long data transmission delay cannot meet the requirement on the data transmission delay of these services.

SUMMARY

The technical problem to be solved by the present disclosure is to provide a lens module with good reliability.

In order to solve the above problem, the present disclosure provides a frequency selection method, a random access method, and an apparatus.

In order to achieve the above object, a first aspect of an embodiment of the present disclosure provides a frequency selection method applied to a network side device, comprising: determining a first band set, wherein the first band set comprises at least one first working band supported by the network side device, and the first working band comprises at least one uplink frequency range and at least one downlink frequency range; and broadcasting the first band set so that a terminal determines, according to the first band set, the at least one uplink frequency range and the at least one downlink frequency range included in the first working band supported by the network side device.

A second aspect of an embodiment of the present disclosure provides a random access method applied to a terminal, comprising: receiving a first band set broadcasted by a network side device, wherein the first band set comprises at least one first working band supported by the network side device, and the first working band comprises at least one uplink frequency range and at least one downlink frequency range; and determining whether the network side device is accessible according to the first band set and a second band set, wherein the second band set comprises at least one second working band supported by the terminal, and the second working band comprises at least one uplink frequency range and at least one downlink frequency range.

A third aspect of an embodiment of the present disclosure provides a frequency selection apparatus applied to a network side device, comprising: a band set determining module for determining a first band set, wherein the first band set comprises at least one first working band supported by the network side device, and the first working band comprises at least one uplink frequency range and at least one downlink frequency range; and a broadcasting module for broadcasting the first band set so that a terminal determines, according to the first band set, the at least one uplink frequency range and the at least one downlink frequency range included in the first working band supported by the network side device.

A fourth aspect of an embodiment of the present disclosure provides a random access apparatus applied to a terminal, comprising: a receiving module for receiving a first band set broadcasted by a network side device, wherein the first band set comprises at least one first working band supported by the network side device, and the first working band comprises at least one uplink frequency range and at least one downlink frequency range; and an access judging module for determining whether the network side device is accessible according to the first band set and a second band set, wherein the second band set comprises at least one second working band supported by the terminal, and the second working band comprises at least one uplink frequency range and at least one downlink frequency range.

According to a fifth aspect of an embodiment of the present disclosure, a non-transitory computer readable storage medium is provided, which includes one or more programs for executing the method according to the above first aspect.

According to a sixth aspect of an embodiment of the present disclosure, a network side device is provided, which includes the non-transitory computer readable storage medium according to the above fifth aspect; and one or more processors for executing the program in the non-transitory computer readable storage medium.

According to a seventh aspect of an embodiment of the present disclosure, a non-transitory computer readable storage medium is provided, which includes one or more programs for executing the method according to the above second aspect.

According to an eighth aspect of an embodiment of the present disclosure, a terminal is provided, which includes the non-transitory computer readable storage medium according to the above seventh aspect; and one or more processors for executing the program in the non-transitory computer readable storage medium.

By adopting the above technical solutions, a first band set is determined, wherein the first band set includes at least one first working band supported by the network side device, and the first working band includes at least one uplink frequency range and at least one downlink frequency range; the first band set is broadcasted, so that a terminal determines, according to the first band set, the at least one uplink frequency range and the at least one downlink frequency range included in the first working band supported by the network side device. In this way, the network side device may broadcast the working band supported by the network side device per se to the terminal, which avoids configuration of the master service network side device and the slave service network side device in the prior art and saves configuration time, so that data transmission delay may be reduced and data transmission efficiency may be improved.

DETAILED DESCRIPTION

Specific embodiments of the present disclosure will be described in details below in connection with the accompanying drawings. It is to be understood that the specific embodiments are described herein for describing and explaining the present disclosure only but are not intended to limit the present disclosure.

The technical solutions provided by the following embodiments of the present disclosure may be applied to a 5G mobile communication system. The system may include a network side device and a terminal. The network side device may be a base station (shorted as BS), wherein the base station is a device that communicates with the terminal, and it may provide communication coverage to a specific physical area. For example, the base station may specifically be an evolved base station (Evolved node B, shorted as ENB or eNodeB) in LTE, or may also be another access network device in the wireless communication network that provides access services.

Terminals may be distributed throughout the mobile communication system, and each terminal may be static or mobile. For example, the terminal may be a mobile station, a subscriber unit, a station, and may also be a wireless communication device such as a cellular phone, a personal digital assistant (abbreviated as PDA), a handheld device, a laptop computer and the like.

The present disclosure will be described in details below in connection with the specific embodiments.

Figure 1:
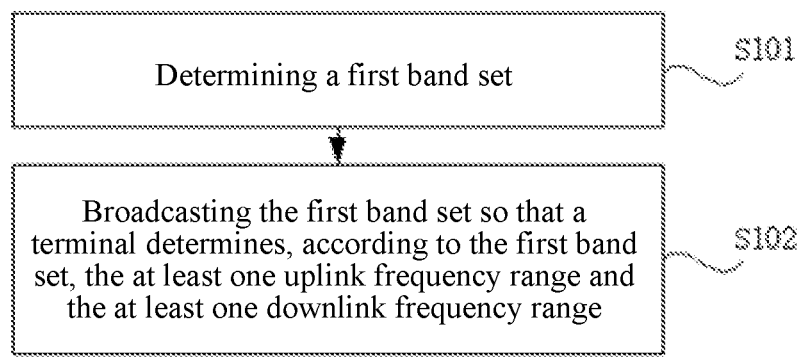
FIG. 1 is a schematic flow chart of a frequency selection method provided by an embodiment of the present disclosure.

FIG. 1 illustrates a frequency selection method provided by an embodiment of the present disclosure, as shown in FIG. 1, the method is applied to a network side device, which includes:

S101, determining a first band set.

The first band set includes at least one first working band supported by the network side device, and the first working band includes at least one uplink frequency range and at least one downlink frequency range.

In this step, the network side device may perform pairing of the uplink frequency ranges and the downlink frequency ranges according to working band capability supported by the network side device.

The pairing may be formed by pairing a high frequency TDD (Time Division Duplexing)/FDD (Frequency Division Duplexing) band and a low frequency FDD/TDD band.

Specifically, according to the working band capability supported by the network side device, the above pairing may be a pairing of a high frequency TDD downlink frequency range and a high frequency TDD uplink frequency range; or a pairing of a high frequency TDD downlink frequency range and a high frequency FDD uplink frequency range; or a pairing of a high frequency TDD downlink frequency range and a low frequency FDD uplink frequency range; or a pairing of a high frequency TDD downlink frequency range and a low frequency TDD uplink frequency range; or a pairing of a high frequency FDD downlink frequency range and a high frequency TDD uplink frequency range; or a pairing of a high frequency FDD downlink frequency range and a high frequency FDD uplink frequency range; or a pairing of a high frequency FDD downlink frequency range and a low frequency FDD uplink frequency range; or a pairing of a high frequency FDD downlink frequency range and a low frequency TDD uplink frequency range; or a pairing of a low frequency TDD downlink frequency range and a low frequency TDD uplink frequency range; or a pairing of a low frequency TDD downlink frequency range and a low frequency FDD uplink frequency range; or a pairing of a low frequency FDD downlink frequency range and a low frequency TDD uplink frequency range; or a pairing of a low frequency FDD downlink frequency range and a low frequency FDD uplink frequency range.

Taking a 5G network as an example, in the 5G network, the coverage capability of the uplink coverage of the system is poorer than that of the downlink coverage and the difference is obvious. Therefore, it may be considered to use a high band in cooperation with a low band. That is, when the uplink coverage of the high band itself is limited, the uplink frequency of the low band is used for uplink data transmission. In this way, in the 5G network, the selected paring of bands may specifically be:

a pairing of a high frequency TDD downlink frequency range and a low frequency FDD uplink frequency range;

a pairing of a high frequency TDD downlink frequency range and a low frequency TDD uplink frequency range;

a pairing of a high frequency FDD downlink frequency range and a low frequency FDD uplink frequency range;

a pairing of a high frequency FDD downlink frequency range and a low frequency TDD uplink frequency range.

That is, when performing pairing, a high band is selected as a downlink frequency range and a low band is selected as an uplink frequency range. In this way, when the uplink coverage of the high band itself is limited, the uplink frequency of the low band may be used for uplink data transmission, so as to enhance coverage capability.

S102, broadcasting the first band set, so that a terminal determines, according to the first band set, the at least one uplink frequency range and the at least one downlink frequency range included in the first working band supported by the network side device.

By adopting the above method, the network side device may broadcast the working band supported by the network side device per se to the terminal. Thus, the configuration of the master service network side device and the slave service network side device in the prior art is avoid and the configuration time is saved, so that data transmission delay may be reduced and data transmission efficiency may be improved.

Figure 2:
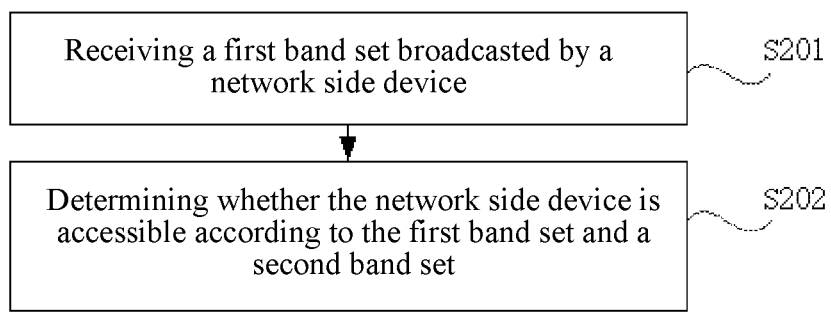
FIG. 2 is a schematic flow chart of a random access method provided by an embodiment of the present disclosure.

FIG. 2 illustrates a random access method provided by an embodiment of the present disclosure, as shown in FIG. 2, the method is applied to a terminal and it includes:

S201, receiving a first band set broadcasted by a network side device.

The first band set includes at least one first working band supported by the network side device, and the first working band includes at least one uplink frequency range and at least one downlink frequency range.

S202, determining whether to access the network side device according to the first band set and the second band set.

The second band set includes at least one second working band supported by the terminal, the second working band includes at least one uplink frequency range and at least one downlink frequency range.

By adopting the above method, the terminal may determine whether to initiate random access, according to the working band supported and broadcasted by the network side device and the working band supported by the terminal per se. Thus, the configuration of the master service network side device and the slave service network side device in the prior art is avoid and the configuration time is saved, so that data transmission delay may be reduced and data transmission efficiency may be improved.

Figure 3:
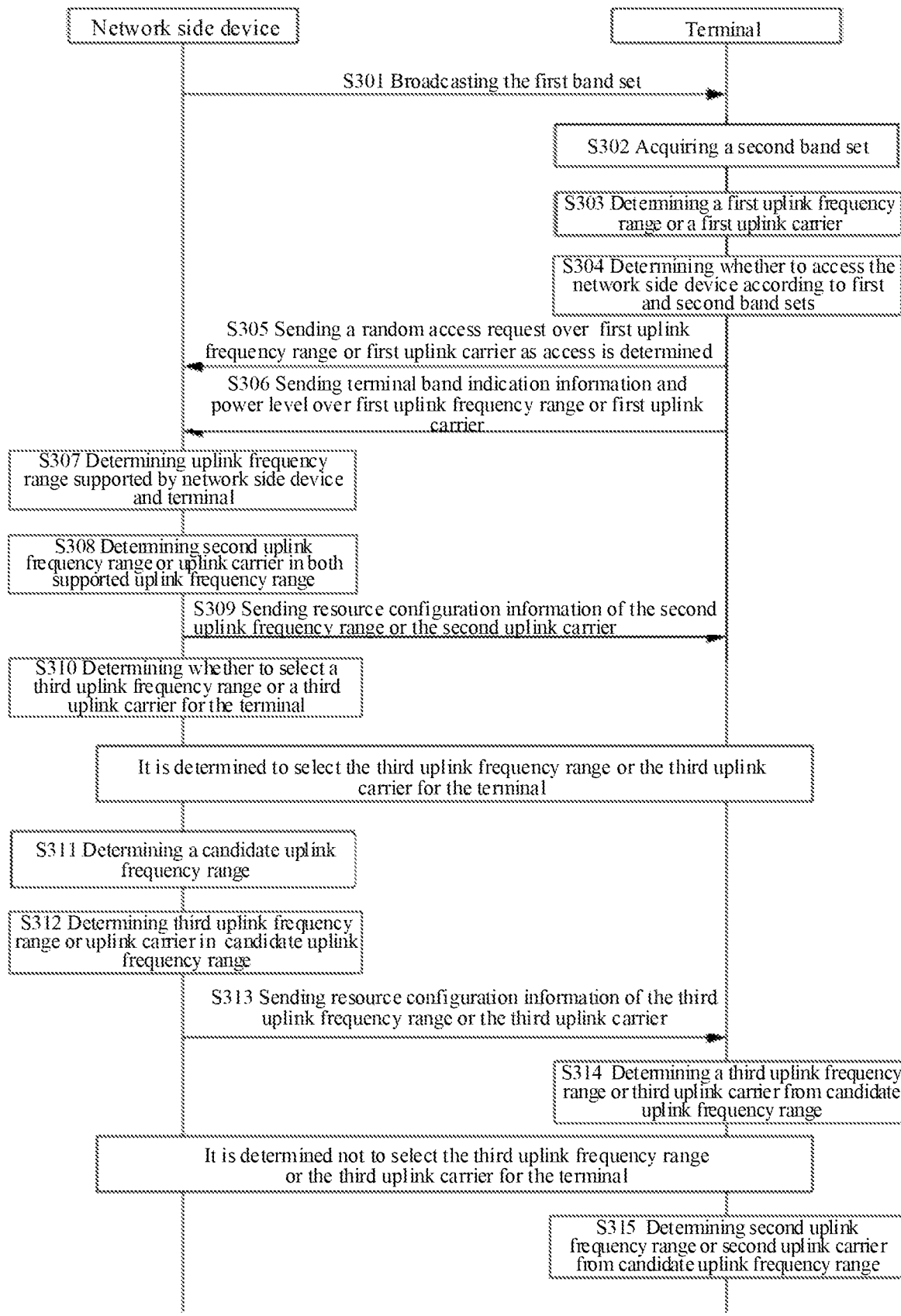
FIG. 3 is a schematic diagram of signaling interaction for a method for sending uplink data provided by an embodiment of the present disclosure.

FIG. 3 is a method for sending uplink data provided by an embodiment of the present disclosure. In the present embodiment, as shown in FIG. 3, the terminal may access the network side device through the above random access method, and the network side device selects for the terminal an uplink frequency range to send uplink data by using the above frequency selection method. The method includes:

S301, after determining a first band set, the network side device broadcasts the first band set over a target downlink frequency range.

The target downlink frequency range is configured by a network management system or the network side device, according to network coverage capability of carriers in respective down link frequency ranges within the first band set; and/or the target downlink frequency range is configured by the network management system or the network side device, according to load status of carriers in respective down link frequency ranges within the first band set.

In this step, the first band set includes at least one first working band supported by the network side device, and the first working band includes at least one uplink frequency range and at least one downlink frequency range.

In a possible implementation, the first working band may include the following two constitution forms. In one constitution form, each first working band includes at least one first uplink frequency range and at least one downlink frequency range supported by the network side device.

For example, the first band set includes one first working band, and the first band set may include:

{first working band 1:
(uplink frequency range 1: 1710-1785 MHz;
uplink frequency range 2: 3300-4200 MHz;
downlink frequency range 1: 3300-4200 MHz)
}

The above first band set represents that the network side device supports uplink data transmission over the above uplink frequency range 1 or uplink frequency range 2 and supports downlink data transmission over the downlink frequency range 1.

For another example, the first band information includes a plurality of first working bands, and the first band set may include:

{first working band 1:
(uplink frequency range 1: 1710-1785 MHz;
uplink frequency range 2: 3300-4200 MHz;
downlink frequency range 1: 1805-1880 MHz;
downlink frequency range 2: 3300-4200 MHz)
first working band 2:
(uplink frequency range 1: 820-830 MHz;
uplink frequency range 2: 3300-4200 MHz;
downlink frequency range 1: 3300-4200 MHz)
}

The above first working band represents that the network side device supports uplink data transmission over the uplink frequency range 1 and the uplink frequency range 2 of the above first working band 1, and supports downlink data transmission over the downlink frequency range 1 and the downlink frequency range 2 of the above first working band 1. The network side device may also support uplink data transmission over the uplink frequency range 1 and the uplink frequency range 2 of the first working band 2, and support downlink data transmission over the downlink frequency range 1 of the first working band 2.

In another constitution form, each first working band includes a first band identification and a second band identification, where, the first band identification indicates the uplink frequency range supported by the network side device, and the second band identification indicates the downlink frequency range supported by the network side device.

The first band identification may be serial numbers corresponding to the uplink frequency ranges supported by the network side device, and the second band identification may be serial numbers corresponding to the downlink frequency ranges supported by the network side device, and bands of different serial numbers represents different frequency ranges.

For example, the first band set may include:

```
{first working band 1:
(uplink band 1: band 3, band 8, band 42;
downlink band 1: band 8, band 42)
second working band 2:
(uplink band 1: band 4, band 7, band 43;
downlink band 1: band 7, band 43)
}
```

The above numbers of 1, 3, 8, and 42 are the serial numbers of the bands. The above first working band supports uplink data transmission by the network side device over the uplink frequency ranges indicated by band 3, band 8 and band 42 in the first working band 1, and supports downlink data transmission over the downlink frequency ranges indicated by band 8 and band 42. The above first working band may also support uplink data transmission by the network side device over the uplink frequency ranges indicated by band 4, band 7 and band 43 in the first working band 2 and support downlink data transmission over the downlink frequency ranges indicated by band 7 and band 43.

S302, the terminal acquires a second band set.

The second band set includes at least one second working band supported by the terminal, and the second working band includes at least one uplink frequency range and at least one downlink frequency range.

It should be noted that, for the constitution form of the second working bands in the second band set, reference may be made to the foregoing description on the constitution form of the first working bands in the first band set, and details are not described herein again.

S303, the terminal determines a first uplink frequency range or a first uplink carrier.

In this step, the first uplink frequency range or first uplink carrier may be determined by the following two manners:

The first manner: the network side device determines the first uplink frequency range or the first uplink carrier from the at least one uplink frequency range supported by the network side device, and broadcasts an uplink band indication message, the uplink band indication message is configured for indicating the first uplink frequency range or indicating a center frequency and a bandwidth of the first uplink carrier, so that the terminal determines the first uplink frequency range or the first uplink carrier according to the uplink band indication message.

In a possible implementation, the network side device may determine the center frequency and the uplink bandwidth of the first uplink carrier, such as the uplink center carrier frequency in the uplink frequency range 880-915 MHz, and the network side device broadcasts the uplink center carrier frequency and the uplink bandwidth (for example, the uplink center carrier frequency is 885 MHz and the uplink bandwidth is 10 MHz).

In another possible implementation, the network side device may also determine the first uplink frequency range, so as to obtain the uplink center carrier frequency by computation according to the range.

The Second manner: the terminal acquires a first receiving power for receiving a downlink reference signal or a downlink synchronization signal over the target downlink frequency range, and determines the first uplink frequency range or the first uplink carrier from the first band set according to the second band set and the first receiving power.

It should be noted that, the above first uplink frequency range or first uplink carrier is generally obtained from a lowest band of the bands as long as the terminal in the coverage area thereof could successfully send a random access request over the band.

S304, the terminal determines whether to access the network side device, according to the first band set and the second band set.

In this step, the terminal may determine whether there is a same working band in both the first working band supported by the network side device and the second working band supported by the terminal. If it is determined that there is the same working band, it is determined that the network side device could be accessed, and if it is determined that there is no same working band, it is determined that the network side device could not be accessed.

For example, the first band set includes:

```
{first working band 1:
(uplink frequency range 1: 1710-1785 MHz;
uplink frequency range 2: 3300-4200 MHz;
downlink frequency range 1: 3300-4200 MHz)
first working band 2:
(uplink frequency range 1: 820-830 MHz;
uplink frequency range 2: 880-915 MHz;
downlink frequency range 1: 4400-4500 MHz)
}
the second band set includes:
{second working band 1:
(uplink frequency range 1: 1710-1785 MHz;
uplink frequency range 2: 3300-4200 MHz;
downlink frequency range 1: 3300-4200 MHz)
second working band 2:
(uplink frequency range 1: 1710-1785 MHz;
uplink frequency range 2: 3300-4200 MHz;
downlink frequency range 1: 4400-4500 MHz)
}
```

From above, the combination of the uplink frequency range 1 and the downlink frequency range 1 in the second working band 1 supported by the terminal is the same as the combination of the uplink frequency range 1 and the downlink frequency range 1 in the first working band 1 supported by the network side device. Therefore, the terminal determines that the network side device could be accessed.

It should be noted that, in the above example, the combination of the uplink frequency range 2 and the downlink frequency range 1 in the second working band 1 is also the same as the combination of the uplink frequency range 2 and the downlink frequency range 1 in the first working band 1. Of course, there may be other identical combinations, which are not pointed out here. In the present embodiment, the terminal determines that there is a same working band only when there are the same uplink frequency range and the same downlink frequency range in both the first working band supported by the network side device and the second working band supported by the terminal.

For another example, the first band set includes:

```
{first working band 1:
(uplink frequency range 1: 1710-1785 MHz;
uplink frequency range 2: 3300-4200 MHz;
```

```
uplink frequency range3: 880-915 MHz;
downlink frequency range 1: 3300-4200 MHz)
first working band 2:
(uplink frequency range 1: 820-830 MHz;
uplink frequency range 2: 880-915 MHz;
downlink frequency range 1: 4400-4500 MHz)
}
```

The second band set includes:

```
{second working band 1:
(uplink frequency range 1: 1710-1785 MHz;
uplink frequency range 2: 3300-4200 MHz;
downlink frequency range 1: 3300-4200 MHz)
second working band 2:
(uplink frequency range 1: 1710-1785 MHz;
uplink frequency range 2: 3300-4200 MHz;
downlink frequency range 1: 4400-4500 MHz)
}
```

From the above, the combination of the uplink frequency range 1 and the downlink frequency range 1 in the second working band 1 is the same as the combination of the uplink frequency range 1 and the downlink frequency range 1 in the first working band 1 (that is, there are the same uplink frequencies and the same downlink frequencies). Therefore, the terminal determines that the network side device could be accessed.

It should be noted that, the combination of the uplink frequency range 2 and the downlink frequency range 1 in the second working band 1 is also the same as the combination of the uplink frequency range 2 and the downlink frequency range 1 in the first working band 1. Of course, there may be other identical combinations, which are not pointed out here. In the present embodiment, the terminal determines that there is a same working band only when there are the same uplink frequency range and the same downlink frequency range in both the first working band supported by the network side device and the second working band supported by the terminal.

In addition, in the present example, in comparison with the above example, the first working band 1 supported by the first band set further includes a first uplink frequency 3. That is, in the present example, the first band set and the second band set are not completely identical. Thus, in order to determine whether the network side device could be accessed, the terminal only has to determine if there are the same uplink frequency range and the same downlink frequency range in both the first working band supported by the network side device and the second working band supported by the terminal, and it is not necessary to determine whether the first working band and the second working band are completely identical with each other.

For yet another example, the first band set includes:

```
{first working band 1:
(uplink frequency range 1: 1710-1785 MHz;
uplink frequency range 2: 3300-4200 MHz;
downlink frequency range 1: 3300-4200 MHz)
}
```

The second band set includes:

```
{second working band 1:
(uplink frequency range 1: 1710-1755 MHz;
uplink frequency range 2: 3300-3800 MHz;
downlink frequency range 1: 3300-3800 MHz)
second working band 2:
(uplink frequency range 1: 1710-1785 MHz;
uplink frequency range 2: 3300-4200 MHz;
downlink frequency range 1: 4400-4500 MHz)
}
```

From above, there are overlapping frequencies 1710-1755 MHz in both the uplink frequency range 1 corresponding to the second working band 1 supported by the terminal and the uplink frequency range 1 of the first working band 1 supported by the network side device (that is, the intersection of the two frequency ranges); and there are overlapping frequencies 3300-3800 MHz in both the downlink frequency range 1 corresponding to the second working band 1 supported by the terminal and the downlink frequency range 1 of the first working band 1 supported by the network side device. Therefore, it is determined that there are the same uplink frequency range and the same downlink frequency range, and the terminal determines to access the network side device.

It should be noted that, there are overlapping frequencies 3300-3800 MHz in both the uplink frequency range 2 corresponding to the second working band 1 supported by the terminal and the uplink frequency range 2 of the first working band 1 supported by the network side device, and there are overlapping frequencies 3300-3800 MHz in both the downlink frequency range 1 corresponding to the second working band 1 supported by the terminal and the downlink frequency range 1 of the first working band 1 supported by the network side device. Of course, there may also be other working bands having overlapped uplink frequency range (that is, there are overlapping frequencies in both the first uplink frequency range and the second uplink frequency range) and overlapped downlink frequencies (that is, there are overlapping frequencies in both the first downlink frequency range and the second downlink frequency range), which are not pointed out here. In the present embodiment, the terminal may determine that the network side device could be accessed, only when it is determined that there is a band having overlapped uplink frequency range and overlapped downlink frequencies in both the first band set and the second band set.

When it is determined that the network side device could be accessed, step S305 to step S310 will be performed;

When it is determined that the network side device could not be accessed, the terminal determines that the network side device is a not accessible network side device.

S305, the terminal sends a random access request to the network side device over the first uplink frequency range or the first uplink carrier.

Herein, after the terminal accesses the network side device, since the first uplink frequency range or the first uplink carrier determined by the terminal is usually obtained from the band with the lowest band so that the terminal within the coverage area could successfully send the random access request. However, the bandwidth of the band at low frequency is often very limited, thus after the terminal accesses the network side device, a second uplink frequency range or a second uplink carrier may be determined by step S305 to step S308, in order to avoid congestion over the first uplink frequency range or the first uplink carrier.

S306, the terminal sends terminal band indication information and power level to the network side device over the first uplink frequency range or the first uplink carrier.

The terminal band indication information includes the second band set, and the power level represents the maximum transmission power of the terminal over the uplink frequency ranges supported by the terminal. The maximum transmission powers correspond to the longest reachable distances of the signals sent by different terminals. The longest reachable distances are different for the terminals at different power levels. The maximum transmission powers corresponding to the different power levels may be configured according to configurations (such as the application scenarios and costs) that is set while designing the terminals and the like. The terminal may only support one power lever in a certain band.

For example, when the level for the maximum transmission power of the terminal at 900 MHz band is 1, the corresponding maximum transmission power is 23 dBm. When the level for the maximum transmission power of the terminal at 900 MHz band is 2, the corresponding maximum transmission power is 26 dBm. When the level of the maximum transmission power of the terminal at 900 MHz band is 3, the corresponding maximum transmission power is 14 dBm. When the level for the maximum transmission power of the terminal at 3.5 GHz band is 1, the corresponding maximum transmission power is 20 dBm. When the level for the maximum transmission power of the terminal at 3.5 GHz band is 2, the corresponding maximum transmission power is 23 dBm. When the level for the maximum transmission power of the terminal at 3.5 GHz band is 3, the corresponding maximum transmission power is 26 dBm.

S307, the network side device determines an uplink frequency range supported by both the network side device and the terminal according to the first band set and the second band set.

S308, the network side device determines a second uplink frequency range or a second uplink carrier from the uplink frequency range supported by both the network side device and the terminal, according to the power level.

In this step, the network side device may determine the second uplink frequency range or the second uplink carrier through the following steps:

S1, the network side device acquires a first receiving power for receiving a downlink reference signal or a downlink synchronization signal by the terminal over the target downlink frequency range.

The first receiving power may be acquired from the random access request, or may also be acquired from the receiving power measurement report reported by the terminal, which is not limited in the present disclosure.

S2, the network side device acquires uplink coverage receiving threshold powers corresponding to the uplink frequency range supported by both the network side device and the terminal, according to the power level.

An uplink coverage receiving threshold power represents an uplink coverage range corresponding to the uplink frequency range supported by both the network side device and the terminal. The greater the uplink coverage receiving threshold power, the smaller the coverage range corresponding to the identification.

In this step S2, the uplink coverage receiving threshold powers may be calculated through the following steps:

S21, the network side service acquires a first transmission power of the downlink reference signal sent by the network side device over the target downlink band, and a lowest receiving power corresponding to the network side device when the terminal sends uplink data over each uplink frequency range supported by both the network side device and the terminal;

S22, the network side device acquires a loss difference value between an uplink path loss value of the terminal and the network side device over each uplink frequency range supported by both the network side device and the terminal, and a downlink path loss value of the terminal and the network side device over the target downlink frequency range.

The uplink path loss value and the downlink path loss value are path loss values obtained by the terminal at the same geographical position; the uplink path loss value and the downlink path loss value are a path loss value obtained by the terminal at the same geographical position. The uplink path loss value and the downlink path loss value may be obtained by measurement of a frequency spectrum analyzer. Alternatively, the uplink path loss value and the downlink path loss value may also be obtained by calculation according to a classical propagation model and frequencies of the i-th second downlink band and the first downlink band. For example, in a dense urban area, the classical propagation model may be a Hata propagation model. The specific procedure for calculating the path loss values according to the model is the same as that in the prior art and will not be described here.

S23, the network side device obtains the uplink coverage receiving threshold powers corresponding to each uplink frequency range supported by both the network side device and the terminal, according to the first receiving power, the lowest receiving power, the loss difference value and the power level, though the following formula:

$$RSRP_{thres} = P_{tx\_1} + PL_{delta} + P_{RX\_i} - P_{UL\_i}$$

wherein $RSRP_{thres}$ represents the uplink coverage receiving threshold power corresponding to the i-th uplink frequency range, $P_{tx\_1}$ represents the first receiving power, $PL_{delta}$ represents the loss difference value between the uplink path loss value of the terminal and the network side device over the i-th uplink frequency range and a downlink path loss value of the terminal and the network side device over the target downlink band, $P_{RX\_i}$ represents the lowest receiving power corresponding to the network side device when the uplink data are sent over the i-th uplink frequency range supported by both the network side device and the terminal, and $P_{UL\_i}$ represents the maximum transmission power corresponding to the power level of the i-th uplink frequency range.

S3, the network side device determines the second uplink frequency range or the second uplink carrier, according to the first receiving power and the uplink coverage receiving threshold powers.

In a possible implementation, when the first receiving power is larger than a first uplink coverage receiving threshold power of the uplink coverage receiving threshold powers, the uplink frequency range corresponding to the first uplink coverage receiving threshold power is determined as the second uplink frequency range, or an uplink carrier in correspondence with the uplink frequency range that corresponds to the first uplink coverage receiving threshold power is determined as the second uplink carrier.

It should be noted that if there are a plurality of the first uplink coverage receiving threshold powers, an uplink frequency range corresponding to the first uplink coverage receiving threshold power having the highest threshold power may be determined as the second uplink frequency range.

S309, the network side device sends to the terminal resource configuration information of the second uplink frequency range or the second uplink carrier.

The resource configuration information of the second uplink frequency range or the second uplink carrier includes information on the frequency, sending time, size of resource blocks and adopted modulation encoding method of the second uplink frequency range or the second uplink carrier. In this way, the terminal may perform data transmission with the network side device over the second uplink frequency range or the second uplink carrier.

S310, the network side device determines whether to select a third uplink frequency range or a third uplink carrier for the terminal, according to the receiving quality of the second uplink frequency range or the second uplink carrier.

In a possible implementation, it is determined that it is necessary to select a third uplink frequency range or a third uplink carrier for the terminal when any of the following conditions is met:

Condition 1: the bit error rate or the block error rate of the data transmitted by the terminal over the second uplink frequency range or the second uplink carrier is greater than a first preset threshold.

The first preset threshold may be set by the network side device according to business requirements.

Condition 2: a second receiving power for an uplink reference signal sent by the terminal over the second uplink frequency range or the second uplink carrier is less than a second preset threshold.

The second preset threshold may be set by the network side device according to the power value at the coverage edge of the third uplink band.

Condition 3: the first receiving power is smaller than the uplink coverage receiving threshold power corresponding to the second uplink frequency range or the second uplink carrier selection.

When it is determined to select the third uplink frequency range or the third uplink carrier for the terminal, step S311 to step S314 will be performed;

When it is determined not to select the third uplink frequency range or the third uplink carrier for the terminal, step S315 will be performed.

S311, the network side device determines a candidate uplink frequency range.

The candidate uplink frequency range is an uplink frequency ranges in the uplink frequency range supported by both the network side device and the terminal, other than the second uplink frequency range;

S312, the network side device determines the third uplink frequency range or the third uplink carrier from the candidate uplink frequency range, according to the uplink coverage receiving threshold power and the first receiving power.

In this step, the third uplink frequency range or the third uplink carrier may be determined from the candidate uplink frequency range according to the first receiving power, the specific implementation of which is the same as that for determining the second uplink frequency range or the second uplink carrier in the above step S308 and the details thereof will not be repeated here.

S313, the network side device sends to the terminal resource configuration information of the third uplink frequency range or the third uplink carrier.

The resource configuration information of the third uplink frequency range or the third uplink carrier may include information on the frequency, sending time, size of resource blocks and adopted modulation coding method of the third uplink frequency range or the third uplink carrier.

S314, the terminal sends uplink data over the third uplink frequency range or the third uplink carrier, according to the resource configuration information of the third uplink frequency range or the third uplink carrier.

S315, the terminal sends uplink data over the second uplink frequency range or the second uplink carrier, according to the resource configuration information of the second uplink frequency range or the second uplink carrier.

By adopting the above method, the network side device may broadcast to the terminal the working band supported by the network side device per se. Thus, the configuration of the master service network side device and the slave service network side device in the prior art is avoid and the configuration time is saved, so that data transmission delay may be reduced and data transmission efficiency may be improved.

Figure 4:
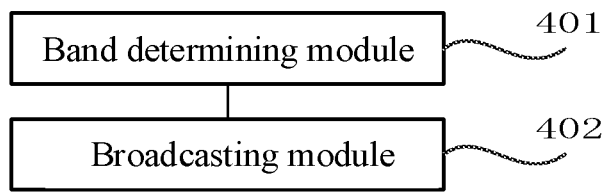
FIG. 4 is a schematic structure diagram of a frequency selection apparatus provided by an embodiment of the present disclosure.

FIG. 4 is a band selection apparatus provided by an embodiment of the present disclosure, as shown in FIG. 4, which includes:

a band set determining module 401 for determining a first band set, wherein the first band set comprises at least one first working band supported by the network side device, and the first working band comprises at least one uplink frequency range and at least one downlink frequency range; and a broadcasting module 402 for broadcasting the first band set so that a terminal determines, according to the first band set, the at least one uplink frequency range and the at least one downlink frequency range included in the first working band supported by the network side device Alternatively, the first band set comprises a first band identification and a second band identification, the first band identification indicating the uplink frequency range supported by the network side device, and the second band identification indicating the downlink frequency range supported by the network side device.

Alternatively, the broadcasting module 402 is configured for determining a target downlink frequency range from the first band set, and broadcasting the first band set over the target downlink frequency range.

Alternatively, the target downlink frequency range is configured by a network management system or the network side device according to network coverage capability of carriers in respective down link frequency ranges within the first band set; and/or the target downlink frequency range is configured by the network management system or the network side device according to load status of carriers in respective down link frequency ranges within the first band set.

Figure 5:
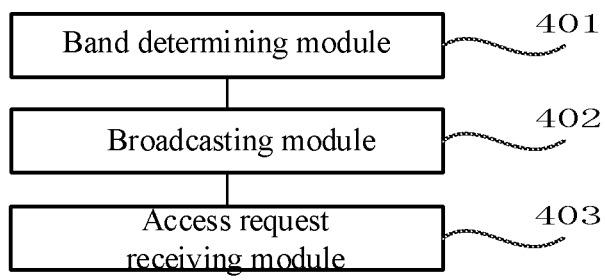
FIG. 5 is a schematic structure diagram of another frequency selection apparatus provided by an embodiment of the present disclosure.

Alternatively, as show in FIG. 5, the apparatus further comprises:

an access request receiving module 403 for receiving a random access request message sent by the terminal over the first uplink frequency range or a first uplink carrier, wherein, the first uplink frequency range or the first uplink carrier is determined by the network side device or the terminal.

Figure 6:
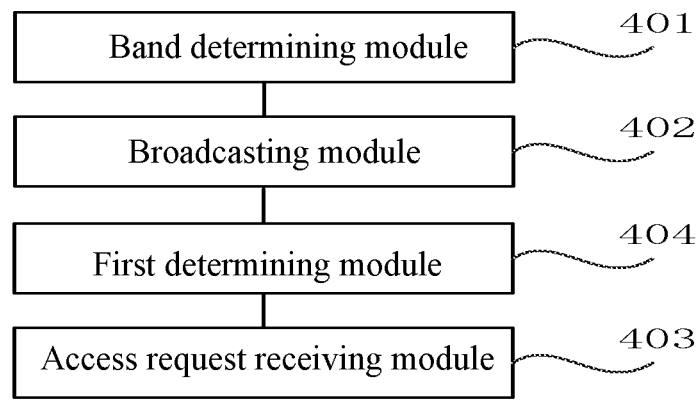
FIG. 6 is a schematic structure diagram of a third frequency selection apparatus provided by an embodiment of the present disclosure.

Alternatively, as show in FIG. 6, the apparatus further comprises:

a first determining module 404 for determining the first uplink frequency range or the first uplink carrier from the at least one uplink frequency range supported by the network side device;

the broadcasting module 402 is further configured for broadcasting an uplink band indication message, so that the terminal determines the first uplink frequency range or the first uplink carrier according to the uplink band indication message, wherein, the uplink band indication message is configured for indicating the first uplink frequency range or indicating a center frequency and a bandwidth of the first uplink carrier.

Figure 7:
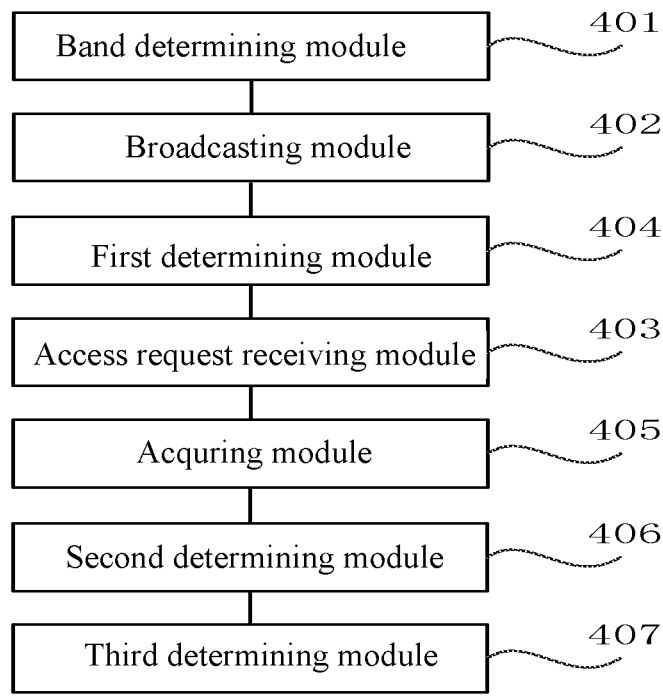
FIG. 7 is a schematic structure diagram of a fourth frequency selection apparatus provided by an embodiment of the present disclosure.

Alternatively, as show in FIG. 7, the apparatus further comprises:

an acquiring module 405 for acquiring terminal band indication information sent by the terminal, wherein, the terminal band indication information comprises a second band set, the second band set comprises at least one second working band supported by the terminal, and the second working band comprises at least one uplink frequency range and at least one downlink frequency range;

a second determining module 406 for determining an uplink frequency range supported by both the network side device and the terminal according to the first band set and the second band set; and a third determining module 407 for determining a second uplink frequency range or a second uplink carrier from the uplink frequency range supported by both the network side device and the terminal.

Alternatively, the acquiring module 405 is configured for configured for receiving the terminal band indication information sent by the terminal over the first uplink frequency range or the first uplink carrier; or acquiring the terminal band indication information from a network management device.

Alternatively, the acquiring module 405 is further configured for receiving a power level corresponding to the uplink frequency range supported by the terminal, the power level representing a maximum transmission power of the terminal over the supported uplink frequency range;

the third determining module 407 is configured for acquiring a first receiving power for the terminal to receive a downlink reference signal or a downlink synchronization signal over the target downlink frequency range, acquiring an uplink coverage receiving threshold power corresponding to the uplink frequency range supported by both the network side device and the terminal, according to the power level, and determining the second uplink frequency range or the second uplink carrier according to the first receiving power and the uplink coverage receiving threshold power, wherein the uplink coverage receiving threshold power represents an uplink coverage range corresponding to the uplink frequency range supported by both the network side device and the terminal.

Alternatively, the third determining module 407 is configured for acquiring the first receiving power from the random access request; or receiving the first receiving power reported by the terminal.

Alternatively, the third determining module 407 is configured for determining the uplink frequency range corresponding to the first uplink coverage receiving threshold power as the second uplink frequency range or the second uplink carrier, when the first receiving power is larger than a first uplink coverage receiving threshold power of the uplink coverage receiving threshold power.

Alternatively, the third determining module 407 is configured for determining, if there are a plurality of the first uplink coverage receiving threshold powers, an uplink frequency range corresponding to the first uplink coverage receiving threshold power with the highest threshold power as the second uplink frequency range.

Figure 8:
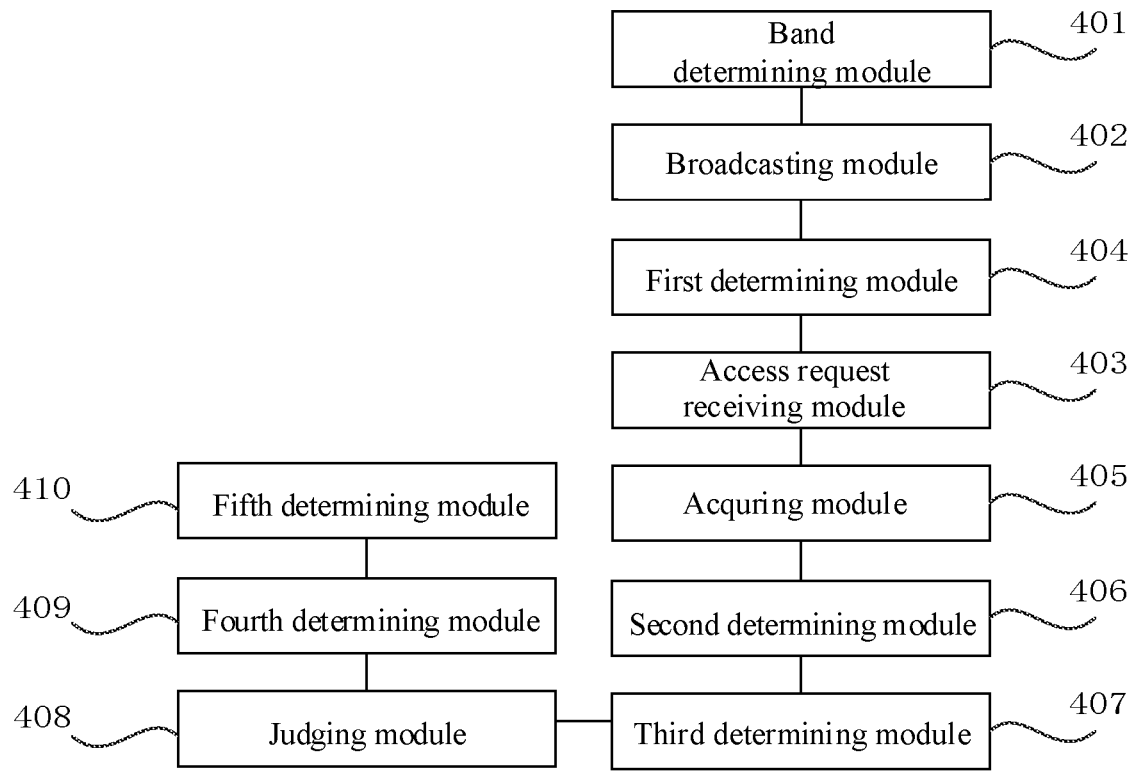
FIG. 8 is a schematic structure diagram of a fifth frequency selection apparatus provided by an embodiment of the present disclosure.

Alternatively, as show in FIG. 8, the apparatus further comprises:

a judging module 408 for determining, according to receiving quality of the second uplink frequency range or the second uplink carrier, whether to select a third uplink frequency range or a third uplink carrier for the terminal;

a fourth determining module 409 for determining candidate uplink frequency ranges, when it is determined to select the third uplink frequency range or the third uplink carrier for the terminal; wherein the candidate uplink frequency ranges are uplink frequency ranges in the uplink frequency range supported by both the network side device and the terminal, other than the second uplink frequency range; and a fifth determining module 410 for determining the third uplink frequency range or the third uplink carrier from the candidate uplink frequency ranges, according to the uplink coverage receiving threshold power and the first receiving power.

Alternatively, the judging module 408 is configured for determining to select the third uplink frequency range or the third uplink carrier for the terminal, when a bit error rate or a block error rate of the data transmitted by the terminal over the second uplink frequency range or the second uplink carrier is greater than or equal to a first preset threshold.

Alternatively, the judging module 408 is configured for determining to select the third uplink frequency range or the third uplink carrier for the terminal, when a second receiving power for an uplink reference signal sent by the terminal over the second uplink frequency range or the second uplink carrier is less than or equal to a second preset threshold.

Alternatively, the judging module 408 is configured for determining to select the third uplink frequency range or the third uplink carrier for the terminal, when the first receiving power is smaller than the uplink coverage receiving threshold power corresponding to the second uplink frequency range or the second uplink carrier.

Alternatively, the fifth determining module 410 is configured for determining candidate uplink coverage receiving threshold powers corresponding to the candidate uplink frequency ranges from the uplink coverage receiving threshold powers; and when the first receiving power is greater than or equal to a second uplink coverage receiving threshold power in the candidate uplink coverage receiving threshold powers, determining that a candidate uplink frequency range corresponding to the second uplink coverage receiving threshold power as the third uplink frequency range or third uplink carrier.

Alternatively, the fifth determining module 410 is configured for determining, if there are a plurality of the second uplink coverage receiving threshold powers, an uplink frequency range corresponding to the highest second uplink coverage receiving threshold power as the third uplink frequency range or the third uplink carrier.

Alternatively, the third determining module 407 is configured for acquiring the uplink coverage receiving threshold power corresponding to the uplink frequency ranges supported by both the network side device and the terminal according to the power level through the following steps:

acquiring a first transmission power for the downlink reference signal sent by the network side device over the target downlink band, and a lowest receiving power corresponding to the network side device when the terminal sends uplink data over each uplink frequency range supported by both the network side device and the terminal;

acquiring a loss difference value between an uplink path loss value of the terminal and the network side device over each uplink frequency range supported by both the network side device and the terminal, and a downlink path loss value of the terminal and the network side device over the target downlink frequency range, wherein the uplink path loss value and the downlink path loss value are path loss values obtained by the terminal at the same geographical position; and obtaining the uplink coverage receiving threshold powers corresponding to each uplink frequency range supported by both the network side device and the terminal though the following formula, according to the first receiving power, the lowest receiving power, the loss difference value and the power level:

$$RSRP_{thres}=P_{tx\_1}+PL_{delta}+P_{RX\_i}-P_{UL\_i}$$

wherein $RSRP_{thres}$ represents the uplink coverage receiving threshold power corresponding to the i-th uplink frequency range, $P_{tx\_1}$ represents the first receiving power, $PL_{delta}$ represents the loss difference value between the uplink path loss value of the terminal and the network side device over the i-th uplink frequency range and a downlink path loss value of the terminal and the network side device over the target downlink band, $P_{RX\_i}$ represents the lowest receiving power corresponding to the network side device when the uplink data are sent over the i-th uplink frequency range supported by both the network side device and the terminal, and $P_{UL\_i}$ represents the maximum transmission power corresponding to the power level of the i-th uplink frequency range.

By adopting the above apparatus, the network side device may broadcast the working band supported by the network side device per se to the terminal. Thus, the configuration of the master service network side device and the slave service network side device in the prior art is avoid and the configuration time is saved, so that data transmission delay may be reduced and data transmission efficiency may be improved.

Figure 9:
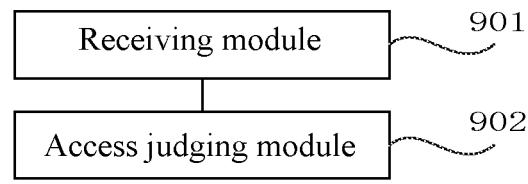
FIG. 9 is a schematic structure diagram of a random access apparatus provided by an embodiment of the present disclosure.

FIG. 9 is an apparatus for random access provided by an embodiment of the present disclosure, as show in FIG. 9, which is applied to the terminal and includes:

a receiving module 901 for receiving a first band set broadcasted by a network side device, wherein the first band set comprises at least one first working band supported by the network side device, and the first working band comprises at least one uplink frequency range and at least one downlink frequency range; and an access judging module 902 for determining whether the network side device is accessible according to the first band set and a second band set, wherein the second band set comprises at least one second working band supported by the terminal, and the second working band comprises at least one uplink frequency range and at least one downlink frequency range.

Alternatively, the receiving module 901 is configured for receiving a first band indication message broadcasted by the network side device over the target downlink frequency range.

Alternatively, the target downlink frequency range is configured by a network management system or the network side device according to network coverage capability of carriers in respective down link frequency ranges within the first band set; and/or the target downlink frequency range is configured by the network management system or the network side device according to load status of carriers in respective down link frequency ranges within the first band set.

Alternatively, the access judging module 902 is configured for determining whether there is a same working band in both the first working band supported by the network side device and the second working band supported by the terminal; determining that the network side device is accessible when it is determined that there is the same working band; and determining that the network side device is not accessible when it is determined that there is no same working band.

Alternatively, the access judging module 902 is configured for determining that there is a same working band when there are a same uplink frequency range and a same downlink frequency range in both the first working band supported by the network side device and the second working band supported by the terminal.

Figure 10:
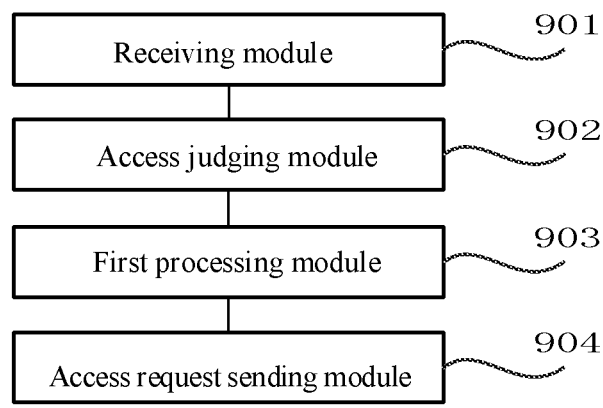
FIG. 10 is a schematic structure diagram of another random access apparatus provided by an embodiment of the present disclosure.

Alternatively, as show in FIG. 10, the apparatus further comprises:

a first processing module 903 for determining a first uplink frequency range or a first uplink carrier, wherein, the first uplink frequency range or the first uplink carrier is determined by the network side device or the terminal; and an access request sending module 904 for sending a random access request to the network side device over the first uplink frequency range or the first uplink carrier.

Alternatively, the first processing module 903 is configured for the first processing module is configured for receiving an uplink band indication message broadcasted by the network side device, and determining the first uplink frequency range or the first uplink carrier according to the uplink band indication message, wherein, the uplink band indication message indicates the first uplink frequency range or first uplink carrier.

Alternatively, the first processing module 903 is configured for acquiring a second band set supported by the terminal; acquiring a first receiving power for receiving a downlink reference signal or a downlink synchronization signal over the target downlink frequency range; and determining the first uplink frequency range or the first uplink carrier from the first band set according to the second band set and the first receiving power.

Figure 11:
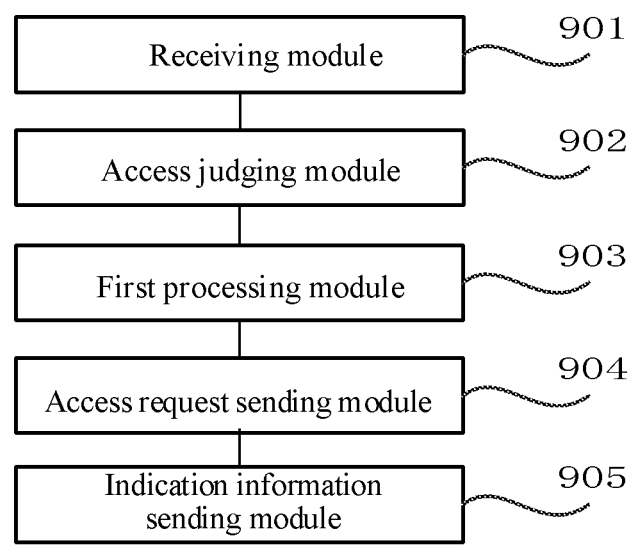
FIG. 11 is a schematic structure diagram of a third random access apparatus provided by an embodiment of the present disclosure.

Alternatively, as show in FIG. 11, the apparatus further comprises:

an indication information sending module 905 for sending terminal band indication information and power level to the network side device over the first uplink frequency range or the first uplink carrier, The terminal band indication information comprises the second band set, and the power level represents the maximum transmission power of the terminal over the supported uplink frequency ranges.

Figure 12:
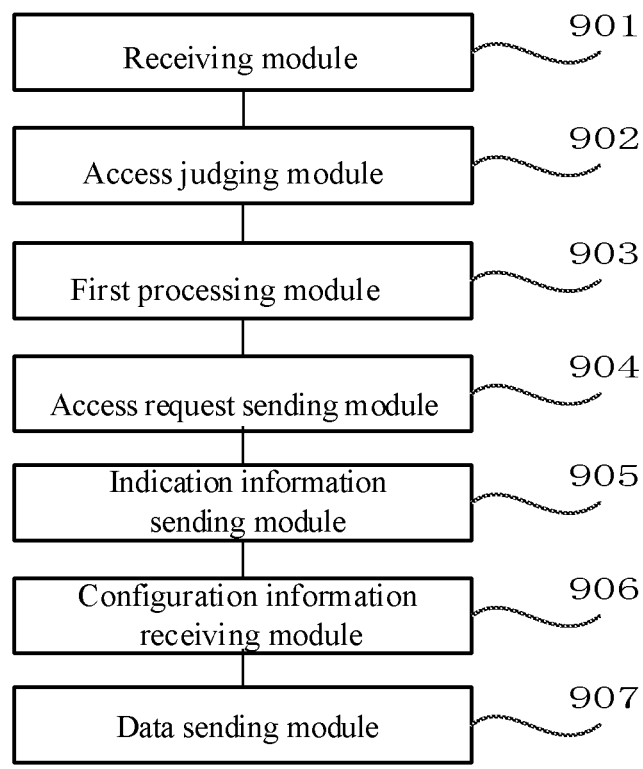
FIG. 12 is a schematic structure diagram of a fourth random access apparatus provided by an embodiment of the present disclosure.

Alternatively, as show in FIG. 12, the apparatus further comprises:

a configuration information receiving module 906 for receiving resource configuration information corresponding to a third uplink frequency range or a third uplink carrier sent by the network side device, wherein, the resource configuration information comprises the third uplink frequency range or the third uplink carrier determined by the network side device for sending uplink data;

a data sending module 907 for sending the uplink data over the third uplink frequency range or the third uplink carrier according to the resource configuration information.

By adopting the above apparatus, the terminal may determine whether to initiate random access according to the working band supported and broadcasted by the network side device and the working band supported by the terminal per se. Thus, the configuration of the master service network side device and the slave service network side device in the prior art is avoid and the configuration time is saved, so that data transmission delay may be reduced and data transmission efficiency may be improved.

Figure 13:
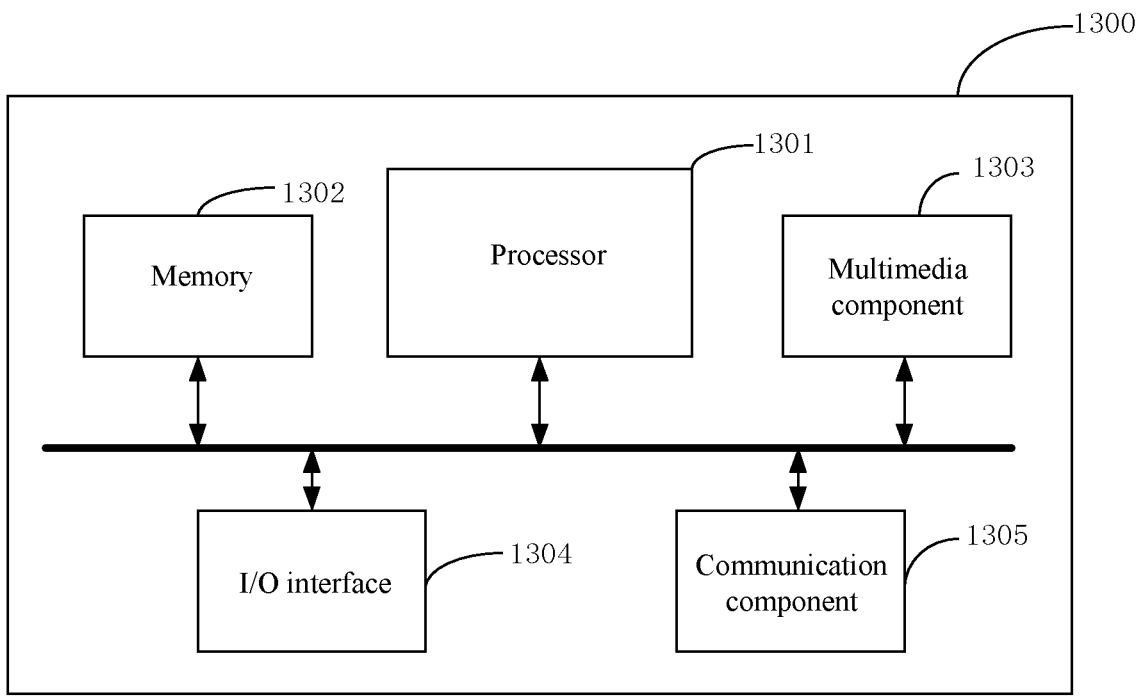
FIG. 13 is a schematic structure diagram of a hardware of a frequency selection apparatus or a random access apparatus provided by an embodiment of the present disclosure.

FIG. 13 is a block diagram of an apparatus for frequency selection or random access provided by an embodiment of the present disclosure, as shown in FIG. 13, which may be applied to the network side device or the terminal. The apparatus 1300 may include: a processor 1301, a memory 1302, a multimedia component 1303, an input/output (I/O) interface 1304, and a communication component 1305.

The processor 1301 is configured to control the overall operation of the apparatus 1300 to complete all or part of the steps of the above random access method. The memory 1302 is configured to store various types of data to support operations at the apparatus 1300. The data may include instructions for any application or method operating on the apparatus 1300, as well as application related data, such as contact data, messages sent and received, pictures, audios, videos and the like.

The memory 1302 may be implemented by any type of volatile or non-volatile storage terminal device or a combination thereof, such as a Static Random Access Memory (shorted as SRAM), an Electrically Erasable Programmable Read-Only Memory (shorted as EEPROM), an Erasable Programmable Read-Only Memory (shorted as EPROM), a Programmable Read-Only Memory (shorted as PROM), a Read-Only Memory (abbreviated as ROM), a magnetic memory, a flash memory, a disk or an optical disk. The multimedia component 1303 may include a screen and an audio component. The screen may be for example a touch screen, and the audio component is configured to output and/or input an audio signal. For example, the audio component may include a microphone for receiving an external audio signal. The received audio signal may be further stored in the memory 1302 or transmitted via the communication component 1305. The audio component also includes at least one speaker for outputting the audio signal. The I/O interface 1304 provides an interface between the processor 1301 and other interface modules. The above other interface modules may be a keyboard, a mouse, a button and the like. These buttons may be virtual buttons or physical buttons. The communication component 1305 is configured for wired or wireless communication between the apparatus 1300 and other terminal devices. Wireless communication may be for example Wi-Fi, Bluetooth, Near Field Communication (shorted as NFC), 2G, 3G or 4G or a combination of one or more of them, so that the corresponding communication component 1305 may include: a Wi-Fi module, a Bluetooth module, a NFC module.

In an exemplary embodiment, the apparatus 1300 may be implemented by one or more Application Specific Integrated Circuits (shorted as ASIC), Digital Signal Processors (shorted as DSP), Digital Signal Processing Terminals Devices (shorted as DSPD), Programmable Logic Devices (shorted as PLD), Field Programmable Gate Arrays (shorted as FPGA), controllers, microcontrollers, microprocessors or other electronic components to perform the above described frequency selection or random access method.

An embodiment of the present disclosure further provides a non-transitory computer readable storage medium 1, which includes one or more programs for executing a frequency selection method comprising:

determining a first band set, wherein the first band set comprises at least one first working band supported by the network side device, and the first working band comprises at least one uplink frequency range and at least one downlink frequency range; and broadcasting the first band set so that a terminal determines, according to the first band set, the at least one uplink frequency range and the at least one downlink frequency range included in the first working band supported by the network side device.

Alternatively, the first band set comprises the first band set comprises a first band identification and a second band identification, the first band identification indicating the uplink frequency range supported by the network side device, and the second band identification indicating the downlink frequency range supported by the network side device.

Alternatively, the broadcasting the first band set comprises: determining a target downlink frequency range from the first band set; and broadcasting the first band set over the target downlink frequency range.

Alternatively, the target downlink frequency range is configured by a network management system or the network side device according to network coverage capability of carriers in respective down link frequency ranges within the first band set; and/or the target downlink frequency range is configured by the network management system or the network side device according to load status of carriers in respective down link frequency ranges within the first band set.

Alternatively, the method further comprises performing the following step after the broadcasting the first band set: receiving a random access request message sent by the terminal over the first uplink frequency range or a first uplink carrier, wherein, the first uplink frequency range or the first uplink carrier is determined by the network side device or determined by the terminal.

Alternatively, when the first uplink frequency range or the first uplink carrier is determined by the network side device, the method further includes performing the following steps before receiving the random access request message sent by the terminal on the first uplink frequency range or the first uplink carrier: determining the first uplink frequency range or the first uplink carrier from the at least one uplink frequency range supported by the network side device; and broadcasting an uplink band indication message, so that the terminal determines the first uplink frequency range or the first uplink carrier according to the uplink band indication message, wherein, the uplink band indication message is configured for indicating the first uplink frequency range or indicating a center frequency and a bandwidth of the first uplink carrier.

Alternatively, the method further comprises: acquiring terminal band indication information sent by the terminal, wherein, the terminal band indication information comprises a second band set, the second band set comprises at least one second working band supported by the terminal, and the second working band comprises at least one uplink frequency range and at least one downlink frequency range; determining an uplink frequency range supported by both the network side device and the terminal according to the first band set and the second band set; and determining a second uplink frequency range or a second uplink carrier from the uplink frequency range supported by both the network side device and the terminal.

Alternatively, the acquiring the terminal band indication information comprises: receiving the terminal band indication information sent by the terminal over the first uplink frequency range or the first uplink carrier; or acquiring the terminal band indication information from a network management device.

Alternatively, determining a second uplink frequency range or a second uplink carrier from the uplink frequency range supported by both the network side device and the terminal comprises: receiving a power level corresponding to the uplink frequency range supported by the terminal, the power level representing a maximum transmission power of the terminal over the supported uplink frequency range; acquiring a first receiving power for the terminal to receive a downlink reference signal or a downlink synchronization signal over the target downlink frequency range; acquiring an uplink coverage receiving threshold power corresponding to the uplink frequency range supported by both the network side device and the terminal, according to the power level; wherein the uplink coverage receiving threshold power represents an uplink coverage range corresponding to the uplink frequency range supported by both the network side device and the terminal; and determining the second uplink frequency range or the second uplink carrier according to the first receiving power and the uplink coverage receiving threshold power.

Alternatively, the acquiring a first receiving power for the terminal to receive a downlink reference signal or a downlink synchronization signal over the target downlink frequency range comprises: acquiring the first receiving power from the random access request; or receiving the first receiving power reported by the terminal.

Alternatively, the determining the second uplink frequency range or the second uplink carrier according to the first receiving power and the uplink coverage receiving threshold power comprises: when the first receiving power is larger than a first uplink coverage receiving threshold power of the uplink coverage receiving threshold power, determining the uplink frequency range corresponding to the first uplink coverage receiving threshold power as the second uplink frequency range or the second uplink carrier.

Alternatively, the determining the uplink frequency range corresponding to the first uplink coverage receiving threshold power as the second uplink frequency range comprises: if there are a plurality of the first uplink coverage receiving threshold powers, determining an uplink frequency range corresponding to the first uplink coverage receiving threshold power with the highest threshold power as the second uplink frequency range.

Alternatively, the method further comprises performing the following steps after determining the second uplink frequency range or the second uplink carrier: determining, according to receiving quality of the second uplink frequency range or the second uplink carrier, whether to select a third uplink frequency range or a third uplink carrier for the terminal; determining candidate uplink frequency ranges, when it is determined to select the third uplink frequency range or the third uplink carrier for the terminal; wherein the candidate uplink frequency ranges are uplink frequency ranges in the uplink frequency range supported by both the network side device and the terminal, other than the second uplink frequency range; and determining the third uplink frequency range or the third uplink carrier from the candidate uplink frequency ranges, according to the uplink coverage receiving threshold power and the first receiving power.

Alternatively, the determining whether to select a third uplink frequency range or a third uplink carrier for the terminal comprises: determining to select the third uplink frequency range or the third uplink carrier for the terminal, when a bit error rate or a block error rate of the data transmitted by the terminal over the second uplink frequency range or the second uplink carrier is greater than or equal to a first preset threshold.

Alternatively, the determining whether to the determining whether to select a third uplink frequency range or a third uplink carrier for the terminal comprises: determining to select the third uplink frequency range or the third uplink carrier for the terminal, when a second receiving power for an uplink reference signal sent by the terminal over the second uplink frequency range or the second uplink carrier is less than or equal to a second preset threshold.

Alternatively, the determining whether to select a third uplink frequency range or a third uplink carrier for the terminal comprises: determining to select the third uplink frequency range or the third uplink carrier for the terminal, when the first receiving power is smaller than the uplink coverage receiving threshold power corresponding to the second uplink frequency range or the second uplink carrier.

Alternatively, the determining the third uplink frequency range or the third uplink carrier from the candidate uplink frequency ranges, according to the uplink coverage receiving threshold power and the first receiving power comprises: determining candidate uplink coverage receiving threshold powers corresponding to the candidate uplink frequency ranges from the uplink coverage receiving threshold powers; and when the first receiving power is greater than or equal to a second uplink coverage receiving threshold power in the candidate uplink coverage receiving threshold powers, determining that a candidate uplink frequency range corresponding to the second uplink coverage receiving threshold power as the third uplink frequency range or third uplink carrier.

Alternatively, if there are a plurality of the second uplink coverage receiving threshold powers, determining an uplink frequency range corresponding to the highest second uplink coverage receiving threshold power as the third uplink frequency range or the third uplink carrier.

Alternatively, the acquiring an uplink coverage receiving threshold power corresponding to the uplink frequency range supported by both the network side device and the terminal, according to the power level comprises:

acquiring a first transmission power for the downlink reference signal sent by the network side device over the target downlink band, and a lowest receiving power corresponding to the network side device when the terminal sends uplink data over each uplink frequency range supported by both the network side device and the terminal;

acquiring a loss difference value between an uplink path loss value of the terminal and the network side device over each uplink frequency range supported by both the network side device and the terminal, and a downlink path loss value of the terminal and the network side device over the target downlink frequency range, wherein the uplink path loss value and the downlink path loss value are path loss values obtained by the terminal at the same geographical position; and obtaining the uplink coverage receiving threshold powers corresponding to each uplink frequency range supported by both the network side device and the terminal though the following formula, according to the first receiving power, the lowest receiving power, the loss difference value and the power level:

$$RSRP_{thres}=P_{tx\_1}+PL_{delta}+P_{RX\_i}-P_{UL\_i}$$

wherein $RSRP_{thres}$ represents the uplink coverage receiving threshold power corresponding to the i-th uplink frequency range, $P_{tx\_1}$ represents the first receiving power, $PL_{delta}$ represents the loss difference value between the uplink path loss value of the terminal and the network side device over the i-th uplink frequency range and a downlink path loss value of the terminal and the network side device over the target downlink frequency range, $P_{RX\_i}$ represents the lowest receiving power corresponding to the network side device when the uplink data are sent over the i-th uplink frequency range supported by both the network side device and the terminal, and $P_{UL\_i}$ represents the maximum transmission power corresponding to the power level of the i-th uplink frequency range.

An embodiment of the present disclosure further provides a network side device 2, which includes:

the above non-transitory computer readable storage medium 1; and one or more processors for executing the program in the non-transitory computer readable storage medium 1.

An embodiment of the present disclosure further provides a non-transitory computer readable storage medium 3, which includes one or more programs for executing a random access method, the method includes: receiving a first band set broadcasted by a network side device, wherein the first band set comprises at least one first working band supported by the network side device, and the first working band comprises at least one uplink frequency range and at least one downlink frequency range; and determining whether the network side device is accessible according to the first band set and a second band set, wherein the second band set comprises at least one second working band supported by the terminal, and the second working band comprises at least one uplink frequency range and at least one downlink frequency range.

Alternatively, the receiving an uplink band indication message broadcasted by the network side device comprises: receiving a first band indication message broadcasted by the network side device over a target downlink frequency range.

Alternatively, the target downlink frequency range is configured by a network management system or the network side device according to network coverage capability of carriers in respective down link frequency ranges within the first band set; and/or the target downlink frequency range is configured by the network management system or the network side device according to load status of carriers in respective down link frequency ranges within the first band set.

Alternatively, the determining whether the network side device is accessible according to the first band set and a second band set comprises: determining whether there is a same working band in both the first working band supported by the network side device and the second working band supported by the terminal; determining that the network side device is accessible when it is determined that there is the same working band; and determining that the network side device is not accessible when it is determined that there is no same working band.

Alternatively, the determining whether there is a same working band in both the first working band supported by the network side device and the second working band supported by the terminal comprises: determining that there is a same working band when there are a same uplink frequency range and a same downlink frequency range in both the first working band supported by the network side device and the second working band supported by the terminal.

Alternatively, when it is determined that the network side device is accessible, the method further comprises: determining a first uplink frequency range or a first uplink carrier, wherein, the first uplink frequency range or the first uplink carrier is determined by the network side device or the terminal; and sending a random access request to the network side device over the first uplink frequency range or the first uplink carrier.

Alternatively, when the first uplink frequency range or the first uplink carrier is determined by the network side device, the determining the first uplink frequency range or the first uplink carrier comprises: receiving an uplink band indication message broadcasted by the network side device, wherein, the uplink band indication message indicates the first uplink frequency range or first uplink carrier; and determining the first uplink frequency range or the first uplink carrier according to the uplink band indication message.

Alternatively, when the first uplink frequency range or the first uplink carrier is determined by the terminal, the determining the first uplink frequency range or the first uplink carrier comprises: acquiring a second band set supported by the terminal; acquiring a first receiving power for receiving a downlink reference signal or a downlink synchronization signal over the target downlink frequency range; and determining the first uplink frequency range or the first uplink carrier from the first band set according to the second band set and the first receiving power.

Alternatively, after determining the first uplink frequency range or the first uplink carrier, the method further comprises: sending terminal band indication information and power level to the network side device over the first uplink frequency range or the first uplink carrier, wherein, the terminal band indication information comprises the second band set, and the power level represents the maximum transmission power of the terminal over the supported uplink frequency ranges.

Alternatively, after the sending terminal band indication information to the network side device over the first uplink frequency range, the method further comprises: receiving resource configuration information corresponding to a third uplink frequency range or a third uplink carrier sent by the network side device, wherein, the resource configuration information comprises the third uplink frequency range or the third uplink carrier determined by the network side device for sending uplink data; and sending the uplink data over the third uplink frequency range or the third uplink carrier according to the resource configuration information.

An embodiment of the present disclosure further provides a terminal 4, which includes:

the above non-transitory computer readable storage medium 3; and one or more processors for executing the program in the non-transitory computer readable storage medium 3.

The preferred embodiments of the present disclosure have been described in detail above in connection with the accompanying drawings. However, the present disclosure is not limited to the specific details of the above embodiments, and various simple modifications can be made to the technical solutions of the present disclosure within the scope of the technical idea of the present disclosure. These simple variations all fall within the protection scope of the disclosure.

In addition, it should be noted that the respective specific technical features described in the above specific embodiments may be combined in any suitable manner without contradiction. In order to avoid unnecessary repetition, various possible combination methods will not be described in the present disclosure separately.

Furthermore, any combination may be made between various embodiments of the present disclosure as long as it does not deviate from the idea of the present disclosure, and should also be regarded as contents of the present disclosure.

What is claimed is:

1. A frequency selection method applied to a network side device, comprising:
    determining a first band set, wherein the first band set comprises at least one first working band supported by the network side device, and the first working band comprises at least one uplink frequency range and at least one downlink frequency range;
    broadcasting the first band set so that a terminal determines, according to the first band set, the at least one uplink frequency range and the at least one downlink frequency range included in the first working band supported by the network side device;
    receiving a random access request message sent by the terminal over a first uplink frequency range or a first uplink carrier, wherein, the first uplink frequency range or the first uplink carrier is determined by the network side device from the at least one uplink frequency range supported by the network side device;
    acquiring terminal band indication information sent by the terminal, wherein, the terminal band indication information comprises a second band set, the second band set comprises at least one second working band supported by the terminal, and the second working band comprises at least one uplink frequency range and at least one downlink frequency range;
    determining an uplink frequency range supported by both the network side device and the terminal according to the first band set and the second band set; and
    determining a second uplink frequency range or a second uplink carrier from the uplink frequency range supported by both the network side device and the terminal;
    wherein, the determining a second uplink frequency range or a second uplink carrier from the uplink frequency range supported by both the network side device and the terminal comprises:
    receiving a power level corresponding to the uplink frequency range supported by the terminal, the power level representing a maximum transmission power of the terminal over the supported uplink frequency range;
    acquiring a first receiving power for the terminal to receive a downlink reference signal or a downlink synchronization signal over the target downlink frequency range;
    acquiring an uplink coverage receiving threshold power corresponding to the uplink frequency range supported by both the network side device and the terminal, according to the power level; wherein the uplink coverage receiving threshold power represents an uplink coverage range corresponding to the uplink frequency range supported by both the network side device and the terminal; and
    determining the second uplink frequency range or the second uplink carrier according to the first receiving power and the uplink coverage receiving threshold power.

2. The method according to claim 1, wherein, the broadcasting the first band set comprises:
    determining a target downlink frequency range from the first band set; and
    broadcasting the first band set over the target downlink frequency range.

3. The method according to claim 2, wherein,
    the target downlink frequency range is configured by a network management system or the network side device according to network coverage capability of carriers in respective down link frequency ranges within the first band set; and/or
    the target downlink frequency range is configured by the network management system or the network side device according to load status of carriers in respective down link frequency ranges within the first band set.

4. The method according to claim 1, further comprising,
    broadcasting an uplink band indication message, so that the terminal determines the first uplink frequency range or the first uplink carrier according to the uplink band indication message, wherein, the uplink band indication message is configured for indicating the first uplink frequency range or indicating a center frequency and a bandwidth of the first uplink carrier.

5. The method according to claim 1, wherein, the acquiring the terminal band indication information comprises:
    receiving the terminal band indication information sent by the terminal over the first uplink frequency range or the first uplink carrier; or
    acquiring the terminal band indication information from a network management device.

6. The method according to claim 1, wherein, the acquiring a first receiving power for the terminal to receive a downlink reference signal or a downlink synchronization signal over the target downlink frequency range comprises:
    acquiring the first receiving power from the random access request; or
    receiving the first receiving power reported by the terminal.

7. The method according to claim 6, wherein, the acquiring an uplink coverage receiving threshold power corresponding to the uplink frequency range supported by both the network side device and the terminal, according to the power level comprises:
    acquiring a first transmission power for the downlink reference signal sent by the network side device over the target downlink band, and a lowest receiving power corresponding to the network side device when the terminal sends uplink data over each uplink frequency range supported by both the network side device and the terminal;
    acquiring a loss difference value between an uplink path loss value of the terminal and the network side device over each uplink frequency range supported by both the network side device and the terminal, and a downlink path loss value of the terminal and the network side device over the target downlink frequency range, wherein the uplink path loss value and the downlink path loss value are path loss values obtained by the terminal at the same geographical position; and
    obtaining the uplink coverage receiving threshold powers corresponding to each uplink frequency range supported by both the network side device and the terminal though the following formula, according to the first receiving power, the lowest receiving power, the loss difference value and the power level:

$$RSRPthres = Ptx\_1 + PLdelta + PRX\_i - PUL\_i$$

wherein RSRPthres represents the uplink coverage receiving threshold power corresponding to the i-th uplink frequency range, Ptx_1 represents the first receiving power, PLdelta represents the loss difference value between the uplink path loss value of the terminal and the network side device over the i-th uplink frequency range and a downlink path loss value of the terminal and the network side device over the target downlink frequency range, PRX_i represents the lowest receiving power corresponding to the network side device when the uplink data are sent over the i-th uplink frequency range supported by both the network side device and the terminal, and PUL_i represents the maximum transmission power corresponding to the power level of the i-th uplink frequency range.

8. The method according to claim 1, wherein, the determining the second uplink frequency range or the second uplink carrier according to the first receiving power and the uplink coverage receiving threshold power comprises:
when the first receiving power is larger than a first uplink coverage receiving threshold power of the uplink coverage receiving threshold power, determining the uplink frequency range corresponding to the first uplink coverage receiving threshold power as the second uplink frequency range or the second uplink carrier.

9. The method according to claim 8, wherein, the determining the uplink frequency range corresponding to the first uplink coverage receiving threshold power as the second uplink frequency range comprises:
if there are a plurality of the first uplink coverage receiving threshold powers, determining an uplink frequency range corresponding to the first uplink coverage receiving threshold power with the highest threshold power as the second uplink frequency range.

10. The method according to claim 1, wherein, the method further comprises performing the following steps after determining the second uplink frequency range or the second uplink carrier:
determining, according to receiving quality of the second uplink frequency range or the second uplink carrier, whether to select a third uplink frequency range or a third uplink carrier for the terminal;
determining candidate uplink frequency ranges, when it is determined to select the third uplink frequency range or the third uplink carrier for the terminal; wherein the candidate uplink frequency ranges are uplink frequency ranges in the uplink frequency range supported by both the network side device and the terminal, other than the second uplink frequency range; and
determining the third uplink frequency range or the third uplink carrier from the candidate uplink frequency ranges, according to the uplink coverage receiving threshold power and the first receiving power.

11. The method according to claim 10, wherein, the determining whether to select a third uplink frequency range or a third uplink carrier for the terminal comprises:
determining to select the third uplink frequency range or the third uplink carrier for the terminal, when a bit error rate or a block error rate of the data transmitted by the terminal over the second uplink frequency range or the second uplink carrier is greater than or equal to a first preset threshold.

12. The method according to claim 10, wherein, the determining whether to select a third uplink frequency range or a third uplink carrier for the terminal comprises:
determining to select the third uplink frequency range or the third uplink carrier for the terminal, when a second receiving power for an uplink reference signal sent by the terminal over the second uplink frequency range or the second uplink carrier is less than or equal to a second preset threshold.

13. The method according to claim 10, wherein, the determining whether to select a third uplink frequency range or a third uplink carrier for the terminal comprises:
determining to select the third uplink frequency range or the third uplink carrier for the terminal, when the first receiving power is smaller than the uplink coverage receiving threshold power corresponding to the second uplink frequency range or the second uplink carrier.

14. The method according to claim 10, wherein, the determining the third uplink frequency range or the third uplink carrier from the candidate uplink frequency ranges, according to the uplink coverage receiving threshold power and the first receiving power comprises:
determining candidate uplink coverage receiving threshold powers corresponding to the candidate uplink frequency ranges from the uplink coverage receiving threshold powers; and
when the first receiving power is greater than or equal to a second uplink coverage receiving threshold power in the candidate uplink coverage receiving threshold powers, determining that a candidate uplink frequency range corresponding to the second uplink coverage receiving threshold power as the third uplink frequency range or third uplink carrier.

15. The method according to claim 14, wherein, if there are a plurality of the second uplink coverage receiving threshold powers, determining an uplink frequency range corresponding to the highest second uplink coverage receiving threshold power as the third uplink frequency range or the third uplink carrier.

16. A non-transitory computer readable storage medium, wherein, the non-transitory computer readable storage medium comprises one or more programs for executing a frequency selection method applied to a network side device, the method comprising:
determining a first band set, wherein the first band set comprises at least one first working band supported by the network side device, and the first working band comprises at least one uplink frequency range and at least one downlink frequency range;
broadcasting the first band set so that a terminal determines, according to the first band set, the at least one uplink frequency range and the at least one downlink frequency range included in the first working band supported by the network side device;
receiving a random access request message sent by the terminal over a first uplink frequency range or a first uplink carrier, wherein, the first uplink frequency range or the first uplink carrier is determined by the network side device from the at least one uplink frequency range supported by the network side device;
acquiring terminal band indication information sent by the terminal, wherein, the terminal band indication information comprises a second band set, the second band set comprises at least one second working band supported by the terminal, and the second working band comprises at least one uplink frequency range and at least one downlink frequency range;
determining an uplink frequency range supported by both the network side device and the terminal according to the first band set and the second band set; and
determining a second uplink frequency range or a second uplink carrier from the uplink frequency range supported by both the network side device and the terminal, wherein, the determining a second uplink frequency range or a second uplink carrier from the uplink frequency range supported by both the network side device and the terminal comprises:

receiving a power level corresponding to the uplink frequency range supported by the terminal, the power level representing a maximum transmission power of the terminal over the supported uplink frequency range;

acquiring a first receiving power for the terminal to receive a downlink reference signal or a downlink synchronization signal over the target downlink frequency range;

acquiring an uplink coverage receiving threshold power corresponding to the uplink frequency range supported by both the network side device and the terminal, according to the power level; wherein the uplink coverage receiving threshold power represents an uplink coverage range corresponding to the uplink frequency range supported by both the network side device and the terminal; and determining the second uplink frequency range or the second uplink carrier according to the first receiving power and the uplink coverage receiving threshold power.

17. A network side device, comprising: one or more processors; and a non-transitory computer readable storage medium for storing one or more programs, when being executed by the processors, the computer program implements a frequency selection method, comprising:

determining a first band set, wherein the first band set comprises at least one first working band supported by the network side device, and the first working band comprises at least one uplink frequency range and at least one downlink frequency range;

broadcasting the first band set so that a terminal determines, according to the first band set, the at least one uplink frequency range and the at least one downlink frequency range included in the first working band supported by the network side device;

receiving a random access request message sent by the terminal over a first uplink frequency range or a first uplink carrier, wherein, the first uplink frequency range or the first uplink carrier is determined by the network side device from the at least one uplink frequency range supported by the network side device;

acquiring terminal band indication information sent by the terminal, wherein, the terminal band indication information comprises a second band set, the second band set comprises at least one second working band supported by the terminal, and the second working band comprises at least one uplink frequency range and at least one downlink frequency range;

determining an uplink frequency range supported by both the network side device and the terminal according to the first band set and the second band set; and determining a second uplink frequency range or a second uplink carrier from the uplink frequency range supported by both the network side device and the terminal, wherein, the determining a second uplink frequency range or a second uplink carrier from the uplink frequency range supported by both the network side device and the terminal comprises:

receiving a power level corresponding to the uplink frequency range supported by the terminal, the power level representing a maximum transmission power of the terminal over the supported uplink frequency range;

acquiring a first receiving power for the terminal to receive a downlink reference signal or a downlink synchronization signal over the target downlink frequency range;

acquiring an uplink coverage receiving threshold power corresponding to the uplink frequency range supported by both the network side device and the terminal, according to the power level; wherein the uplink coverage receiving threshold power represents an uplink coverage range corresponding to the uplink frequency range supported by both the network side device and the terminal; and determining the second uplink frequency range or the second uplink carrier according to the first receiving power and the uplink coverage receiving threshold power.

* * * * *